(12) United States Patent
Jonnala et al.

(10) Patent No.: US 8,639,904 B2
(45) Date of Patent: Jan. 28, 2014

(54) METHOD AND SYSTEM FOR MANAGING HEAP ACROSS PROCESS REPLICATION

(75) Inventors: Uday Kiran Jonnala, Bangalore (IN); Dileep Prabhakaran Thekkemuriyil, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 878 days.

(21) Appl. No.: 12/603,905

(22) Filed: Oct. 22, 2009

(65) Prior Publication Data

US 2010/0042800 A1 Feb. 18, 2010

(51) Int. Cl.
*G06F 12/00* (2006.01)
(52) U.S. Cl.
USPC .................................. 711/170; 711/E12.002
(58) Field of Classification Search
USPC ........................................ 711/170, E12.002
See application file for complete search history.

(56) References Cited

U.S. PATENT DOCUMENTS

| 4,758,951 | A | * | 7/1988 | Sznyter, III | 711/206 |
|---|---|---|---|---|---|
| 5,093,913 | A | * | 3/1992 | Bishop et al. | 711/152 |
| 5,835,724 | A | * | 11/1998 | Smith | 709/227 |
| 7,082,601 | B2 | * | 7/2006 | Ohsawa et al. | 717/149 |
| 7,610,473 | B2 | * | 10/2009 | Kissell | 712/235 |
| 2002/0199172 | A1 | * | 12/2002 | Bunnell | 717/128 |
| 2003/0014473 | A1 | * | 1/2003 | Ohsawa et al. | 709/107 |
| 2005/0138623 | A1 | * | 6/2005 | Fresko | 718/102 |
| 2007/0011415 | A1 | * | 1/2007 | Kaakani et al. | 711/159 |
| 2007/0136385 | A1 | * | 6/2007 | Abrashkevich et al. | 707/200 |
| 2008/0077922 | A1 | * | 3/2008 | Doring | 718/100 |

FOREIGN PATENT DOCUMENTS

| EP | 0533446 | 3/1993 |
|---|---|---|
| EP | 0693728 | 1/1996 |

OTHER PUBLICATIONS

Tevanian Jr. Avadis: "Architecture-Independent Virtual Memory Management for Parallel and Distributed Environments: The Mach Approach". IP.com Journal, IP.com Inc., West Henrietta, NY, US, No. IPCOMOO0148170D, Mar. 29, 2007, XP013119093, ISSN: 1533-0001 chapter 3.2.3.

The GNU Mach Reference Manual [online]. Free Software Foundation, Inc., Nov. 17, 2006 (retrieved on Oct. 14, 2009). Retrieved fm the Internet: <URL: http://web.archive .org/web/20061209160000/ http://www.gnu.org/software/hurd/gnumach-doc/mach.pdf> p. 46, description of function vm;nherit.

* cited by examiner

*Primary Examiner* — Mardochee Chery

(57) ABSTRACT

A method and system for dynamically allocating memory, the method comprising maintaining a record of allocated memory that should be considered free in a child process, and designating as free any copy of memory identified by the record and created in a forking process.

10 Claims, 4 Drawing Sheets

US 8,639,904 B2

METHOD AND SYSTEM FOR MANAGING HEAP ACROSS PROCESS REPLICATION

RELATED APPLICATIONS

This patent application claims priority to, and incorporates by reference, International Application No. PCT/IN2008/000261, having International filing date Apr. 24, 2008, having International Publication Number WO 2008/132761 A2, having International Publication Date Nov. 6, 2008, commonly assigned with this application, and having title "Method and System for Managing Heap Across Process Replication", itself claiming priority to, and incorporating by reference, an Indian (India) patent application number 896/CHE/2007, having filing date of Apr. 26, 2007, commonly assigned with this application, and having title "Method and System for Managing Heap Across Process Replication".

BACKGROUND OF THE INVENTION

One process replication approach in the UNIX family of operating systems (e.g. HP-UX, AIX and Solaris) involves copying the entire dynamic memory allocated portion ('heap') to the child process. Information about allocated (or used) and free blocks is retained in the child process. Comparable approaches are used in some other operating systems.

However, this approach has a number of disadvantages. The memory allocated in a parent process may not be required in the child process and—if it is not used by the child process—it must be explicitly freed in the child process if required elsewhere; the user must therefore keep track of all dynamically allocated memory chunks across the lifetime of an application and have the correct information available at the time of fork( ), so that the allocated memory is freed in the child process. Heap management algorithms, most of which use data structures termed "free lists", are used to keep track of which parts of the memory are in use and which parts are free. In a free list, the free blocks are linked together in a list, typically ordered by starting addresses, with each node having information on the size of the memory available and the address of the memory location; the memory is considered as comprising a number of chunks, each with some size, as depicted schematically at 100 in FIG. 1. In FIG. 1, the blocks are numbers sequentially, free blocks are shown shaded, and used blocks are shown unshaded.

There may be two lists, one for used space, one for free. FIG. 2 depicts this arrangement schematically at 200 for the block usage shown in FIG. 1. In FIG. 2, the first field of each listed group of memory blocks 202, 204, 206, 208, 210 indicates whether the list is of used (U) or free (F) blocks; the second field indicates the address of the first block in a group of either used or free blocks and the third field indicates the number of blocks in that respective group. Thus, the upper register of FIG. 2 (comprising groups 202, 204 and 206) constitutes a first list (viz. of used memory blocks) 212 and the lower register (comprising groups 208 and 210) constitutes a second list (viz. of free memory blocks) 214.

Although these lists need not be ordered, in this example the contents of lists 212, 214 are ordered by block position. However, the lists may alternatively be ordered by size, as depicted schematically (also for the block usage shown in FIG. 1) at 300 in FIG. 3. In FIG. 3 list 302 of used blocks and list 304 of free blocks are ordered—from left to right—in order of increasing size of contiguous used and free chunks of memory, respectively.

In such implementations, a singly linked list of free memory chunks, called free list, is thus maintained (cf. free lists 214 and 304 of FIGS. 2 and 3 respectively). When a request to allocate memory is made, an appropriate chunk of free memory is found from the free list. How this chunk is found depends on the "fit policy." Fit policies generally followed in existing systems are:

i) SEQUENTIAL FITS, including first fit, next fit, best fit, and worst fit;

ii) SEGREGATED FREE LISTS, including simple segregated storage and segregated fits;

iii) BUDDY SYSTEMS, including binary, weighted, and Fibonacci buddies, and double buddies;

iv) INDEXED FITS, which use structured indexes to implement a desired fit policy; and v) BIT-MAPPED FITS, which are a particular kind of indexed fits.

Some existing implementations use Binning systems, where available chunks are maintained in bins that are grouped by size. This is usually implemented as a lookup table, comprising an array indexed by size, whose values are the numbers of the ranges. To look up which range a size falls into, the system indexes into the array and fetch the value stored there. When the memory is freed, that chunk of memory is allocated into the free list and may be taken and coalesced with its adjacent chunks in constant time, so that the memory chunk can be entered into the free list after coalescing.

In multi-threaded applications, the task of keeping track of memory allocation is even more complicated, owing to different threads of execution occurring at different times; some method of synchronization is required for handling the list of allocated blocks. This additional synchronization reduces the performance of all memory allocation and deallocation in the user application.

Furthermore, in multithreaded programs POSIX pthread_atfork( ) handlers are used to free memory in the child process. However, a race condition can arise between the fork happening in a forking thread and the time period between memory allocation and atfork handler registration in another thread.

Additionally, since there is no way to remove a registered atfork handler, a handler for freeing memory in a child process may lead to the freeing of dangling pointers if this particular memory chunk has already been released by the system. Each memory block has to be tracked by using a corresponding flag in the user application, which can lead to performance overheads in the application and duplicate book keeping with the memory allocator.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There will be provided a method and system for dynamically allocating memory.

In one embodiment, the method comprises maintaining a record of allocated memory that should be considered free in a child process, and designating as free any copy of memory identified by the record and created in a forking process.

There will also be provided a computing system. In one embodiment, the computing system, comprises an operating system configured to maintain a record of allocated memory a copy of which should be considered free in a child process and to designate as free any copy of said allocated memory identified by the record created in a forking process.

Figure 4:
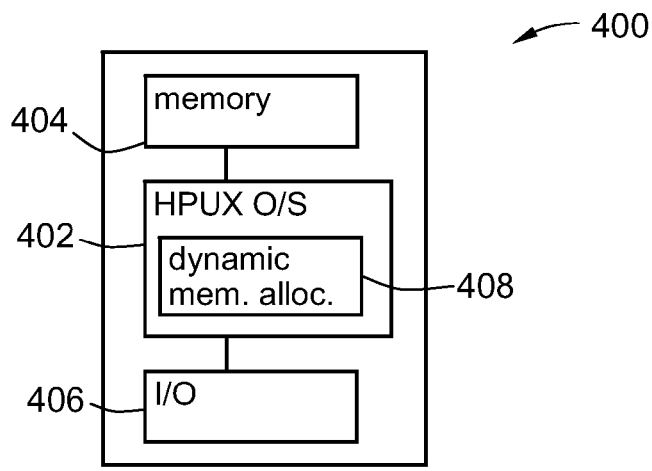
FIG. 4 is a schematic view of a computing system according to an embodiment of the present invention.

FIG. 4 is a schematic view of a computing system 400 according to an embodiment of the present invention. Only features relevant to gaining an understanding of this embodiment are shown. Thus, system 400 comprises a HP-UX enterprise server that has an operating system in the form of a HP-UX operating system 402. System 200 also has a memory 404 and I/O 406.

Operating system 402 is configured to distinguish between those requests from a parent process for memory to be allocated and also considered used in any child process, and those requests from a parent process for memory to be allocated but which is not required in child processes so should be considered free in child processes. According to this embodiment, therefore, there is defined an API (Application Program Interface) called "forkmalloc( )" (though any suitable name may be employed), which is similar to malloc( ) with respect to function arguments. The API malloc( ) is used when the allocated memory should be considered used in both parent and child processes, whereas forkmalloc( ) is used when the allocated memory should be considered used in the parent process but free in child processes, thereby avoiding needless free( ) calls to free the memory in child processes.

Thus, operating system 402 has a dynamic memory allocator 408 that is configured to respond to requests from an application for one or more memory blocks, whether they are to be considered as used or free in child processes. Memory allocator 408 is controlled by the user's use of malloc( ) or forkmalloc( ) as described above. When forkmalloc( ) is called and—in response—allocates memory in the parent process, memory allocator 408 keeps track of these blocks and frees them (that is, their copies created in a forking process) in the child process when process replication occurs. Otherwise, if malloc( ) is called and allocates memory in the parent process, memory allocator 408 does not keep track of these allocated blocks and, on conventional lines, these blocks (that is, their copies created in a forking process) are left to be allocated in the child process when process replication occurs.

This approach is most clearly applicable to the UNIX family of operating systems, but it may also be of value with other operating systems. It will be appreciated by those in the art that, with suitable modification, it may be used with any operating system that would otherwise preserve the status of memory upon memory replication, such as when creating a child process.

Figure 1:
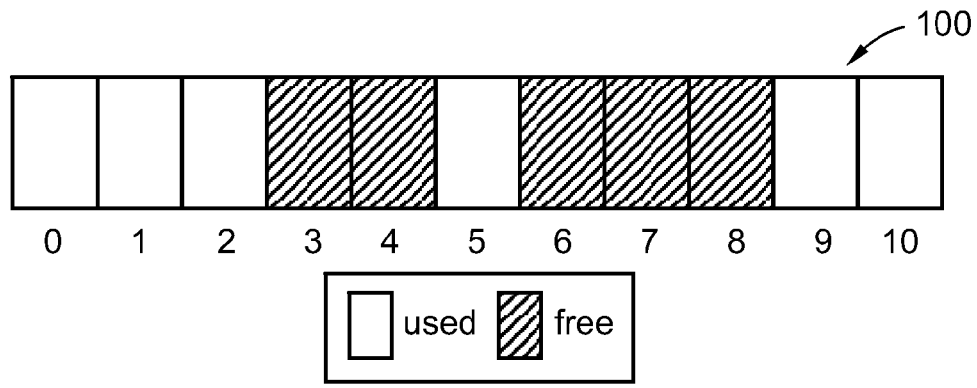
FIG. 1 is a schematic view of a group of memory blocks in a memory of the background art.
Figure 5:
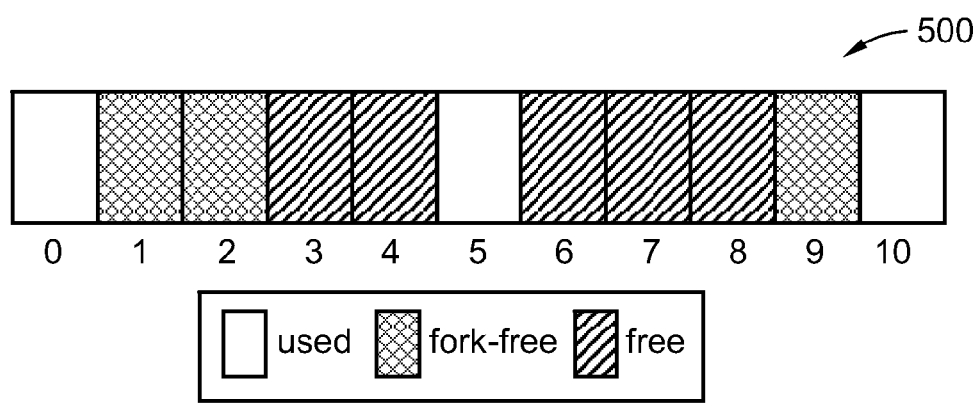
FIG. 5 is a schematic view of an exemplary group of memory blocks of the computing system of FIG. 4.

FIG. 5 is a schematic view (comparable to that of FIG. 1) of an exemplary group of memory blocks 500 in memory 404, where some blocks have been allocated as free blocks in the child process according to this embodiment. Referring to FIG. 5, used memory blocks (in this example at positions 0, 5 and 10) are shown unshaded, free memory blocks (in this example at positions 3, 4, 6, 7 and 8) are shown shaded, and blocks allocated but so as to be free blocks in the child process (in this example at positions 1, 2 and 0)—also termed "fork-free"—are shown cross-hatched.

Figure 2:
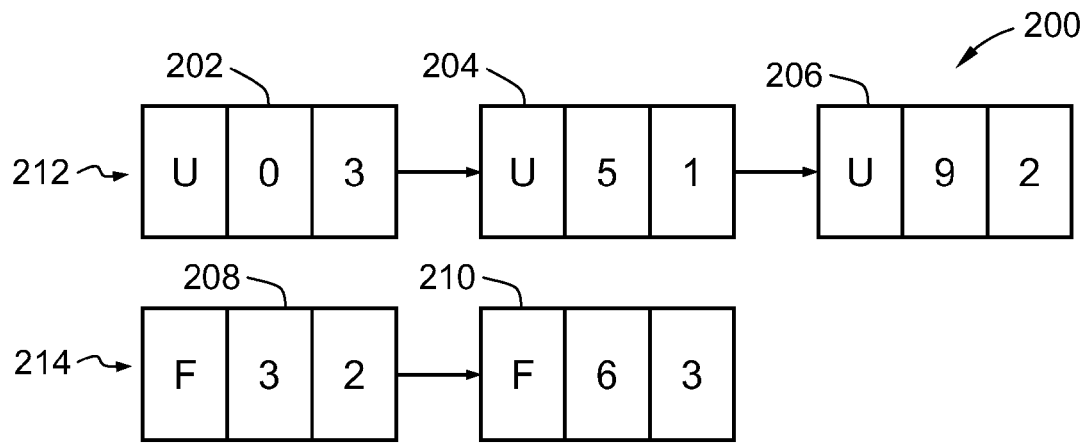
FIG. 2 is a schematic view of background art used and free lists for the group of memory blocks of FIG. 1, ordered by position.
Figure 3:
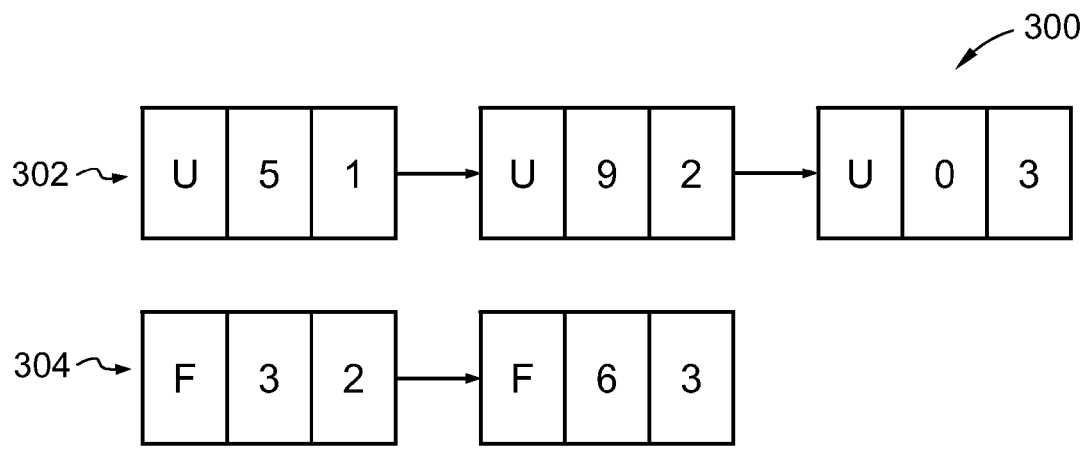
FIG. 3 is a schematic view of background art used and free lists for the group of memory blocks of FIG. 1, ordered by chunk size.
Figure 6:
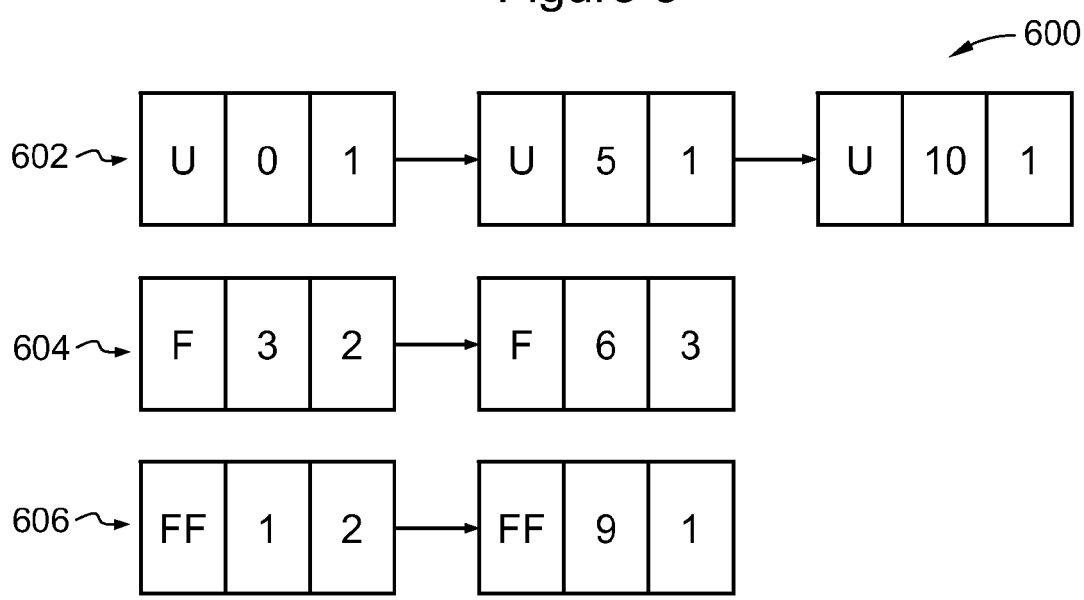
FIG. 6 is a schematic view of the used, free and fork-free lists for the group of memory blocks of FIG. 5, ordered by position, according to an embodiment of the present invention.

Memory allocator 408 maintains these memory blocks in separate lists while they are alive. The allocation shown in FIG. 5, for example, is listed as shown schematically at 600 in FIG. 6. Three lists are maintained: a first list 602 of used blocks, a second list 604 of free blocks and a third list 606 of fork-free blocks. Lists 602, 604 and 606 are ordered, according to this embodiment, by block address (cf. FIG. 2), though in other embodiments of the invention they may ordered otherwise, such as by size (cf. FIG. 3), or left unordered.

As described above, the fork-free blocks are placed in third list 606 when an application uses forkmalloc( ). When the parent process uses free( ) to free blocks, the relevant blocks are added to the second list 604 (i.e. of free blocks).

Figure 7:
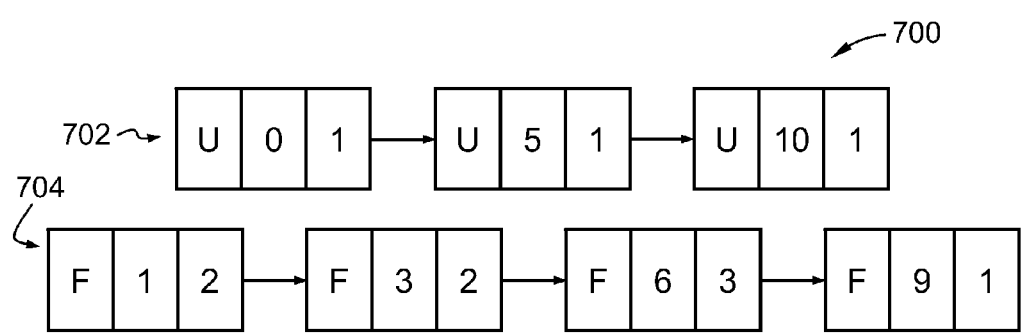
FIG. 7 is a schematic view of the used and free lists for the group of memory blocks of FIG. 5 as copied in a child process, according to an embodiment of the present invention.

During forking (a process replication), the fork-free blocks (i.e. in third list 606 in this example) are appended to the second list (i.e. of free blocks) automatically, so that they are free in the child process. Appending the fork-free blocks to free-list is performed with a conventional insertion mechanism and includes coalescing the entries in the free list. FIG. 7 depicts schematically at 700 the resulting two lists of, respectively, used memory blocks 702 and free memory blocks 704, following copying of the heap in the fork( ) operation. All the formerly fork-free blocks have, in the copied heap, been moved to second list 704 of free blocks, which has then been ordered according to address.

Figure 8:
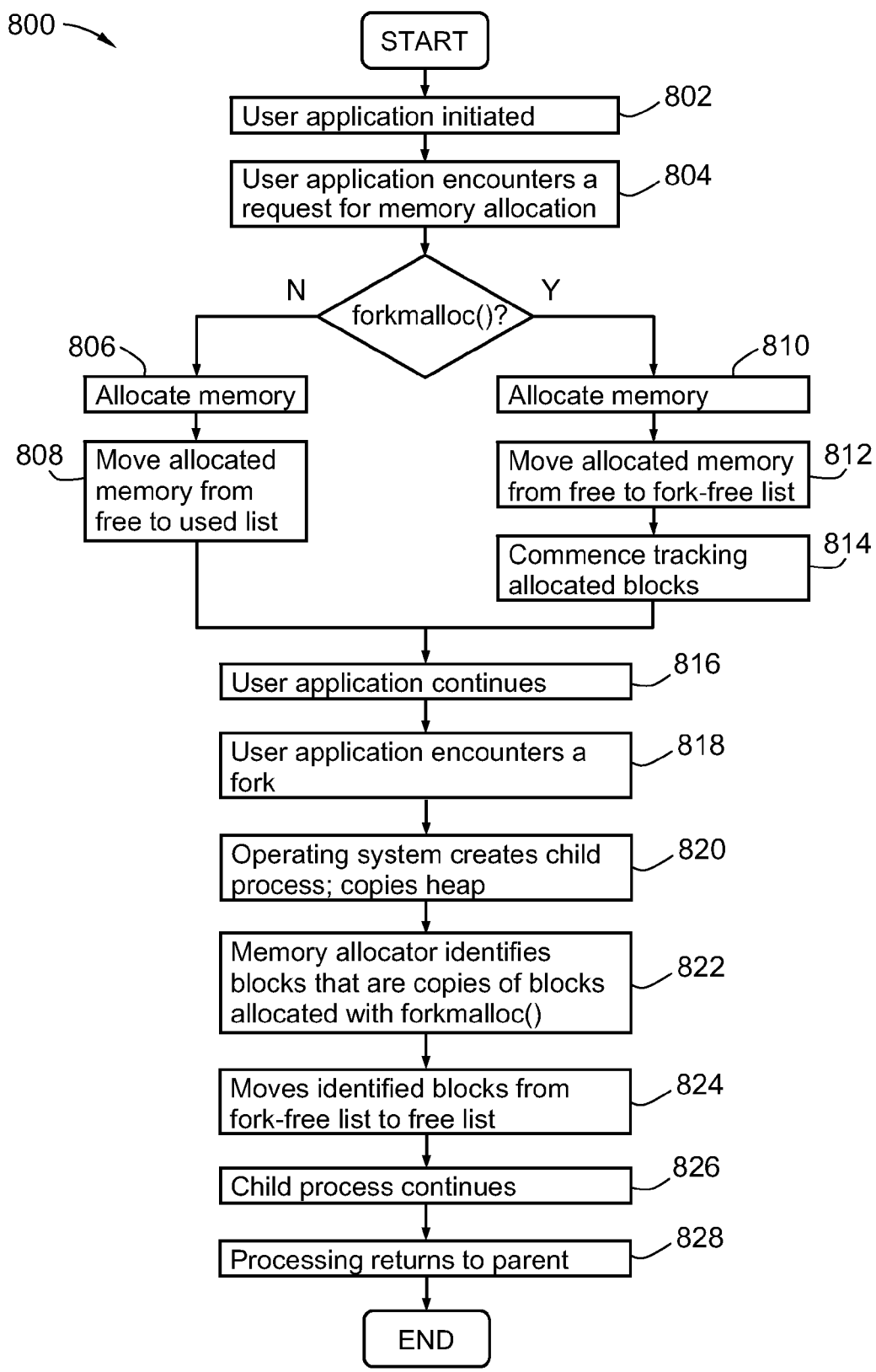
FIG. 8 is a flow diagram of a method implemented according to an embodiment of the present invention in the computing system of FIG. 4.

FIG. 8 is a flow diagram 800 of the method thus implemented by system 400. At step 802, a user application is initiated on system 400. At step 804, the user application encounters a request for memory allocation. If the request is in the form of malloc( ), at step 806 memory allocator 408 responds by allocating memory and, at step 808, moves the allocated blocks from the free list 604 to the used list 602; processing then continues at step 816. If, at step 804, the user application encounters an instance of forkmalloc( ), at step 810 memory allocator 408 responds by allocating memory. Allocator 408 then, at step 812, moves the allocated blocks from the free list 604 to the fork-free list 606 and, at step 814, commencing tracking the allocated memory blocks. Processing then continues at step 816.

At step 816 the user application continues until, at step 818, it encounters a fork and the operating system responds, at step 820, by creating a child process, which includes copying the heap. At step 822, memory allocator 408 identifies which (if any) of the blocks in the copied heap were copied from blocks that were allocated in the parent with forkmalloc( ) and, at step 824, moves the identified blocks from the fork-free list 606 to the free list 704. At step 824, the child process continues (and, of course, may include further memory allocation, forking, etc) until, upon the completion of the child process, processing returns to the parent process at step 826. Processing according to the present embodiment is thus complete.

One advantage of this approach is that the user need not keep track of the allocated memory chunks in the parent process. Further, the user does not have to use atfork handlers for memory freeing operations. Additional synchronization mechanisms and associated performance overheads are avoided. Allowing the dynamic memory allocator to free up the memory in the child process is more efficient, since it reduces the number of any function calls (e.g. of free( )).

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method for dynamically allocating memory, comprising:
    maintaining a record of memory allocated in a parent process that is considered free in a child process prior to the child process occurring; and
    designating as fork-free any copy of memory identified by said record and created in a forking process.

2. A method for dynamically allocating memory, comprising:
    defining a first memory allocation routine during a parent process for allocating memory a replication of which, when created in a forking process, is treated as allocated prior to the child process occurring; and
    defining a second memory allocation routine during a parent process for allocating memory a replication of which, when created in a forking process, is treated as free prior to the child process occurring.

3. The method as claimed in claim 2, comprising:
    responding to said first memory allocation routine by allocating memory and, upon replication of said memory in a forking process to make a copy of said memory, treating said copy of said memory as allocated; and
    responding to said second memory allocation routine by allocating memory and, upon replication of said memory in a forking process to make a copy of said memory, treating said copy of said memory as free.

4. A computing system, comprising:
    an operating system configured to maintain a record of allocated memory during a parent process a copy of which is free in a child process prior to the child process occurring and to designate as fork-free any copy of said allocated memory identified by said record and created in a forking process.

5. A computing system, comprising:
    a first memory allocation routine created during a parent process for allocating memory a copy of which is treated as allocated in any child process prior to the child process occurring; and
    a second memory allocation routine created during a parent process for allocating memory a copy of which is treated as free in any child process prior to the child process occurring;
    wherein said system is configured to respond to said first memory allocation routine in a parent process by allocating memory and, upon replication of said allocated memory in a forking process, treating a resulting copy of said allocated memory as allocated in a child process of said parent process and to respond to said second memory allocation routine in a parent process by allocating memory and, upon replication of said allocated memory in a forking process, treating a resulting copy of said allocated memory as free in a child process of said parent process.

6. The system as claimed in claim 5, including a memory allocation routine comprising said first memory allocation routine and said second memory allocation routine.

7. An operating system, comprising:
    a first memory allocation routine created during a parent process for allocating memory a copy of which is treated as allocated in any child process prior to the child process occurring; and
    a second memory allocation routine created during a parent process for allocating memory a copy of which is treated as free in any child process prior to the child process occurring;
    wherein said first memory allocation routine is configured when invoked in a parent process to allocate memory and, upon replication of said allocated memory in a forking process, to treat a resulting copy of said allocated memory as allocated in any child process of said parent process and said second memory allocation routine is configured when invoked in a parent process to allocate memory and, upon replication of said allocated memory in a forking process, to treat a resulting copy of said allocated memory as free in any child process of said parent process.

8. The operating system as claimed in claim 7, including a memory allocation routine comprising said first memory allocation routine and said second memory allocation routine.

9. A non-transitory computer readable medium provided with program data that, when executed on a computing system, implements the method of claim 1.

10. A non-transitory computer readable medium provided with program data that, when executed on a computing system, implements the method of claim 2.

* * * * *